United States Patent [19]
Truax

[11] Patent Number: 6,155,905
[45] Date of Patent: Dec. 5, 2000

[54] CAT TOY

[76] Inventor: Melissa A. Truax, 2121 N. Causeway Blvd., #200, Metairie, La. 70001

[21] Appl. No.: 09/365,717

[22] Filed: Aug. 3, 1999

Related U.S. Application Data

[60] Provisional application No. 60/095,220, Aug. 4, 1998.
[51] Int. Cl.⁷ ............................ A63H 11/00; A63H 13/00
[52] U.S. Cl. ...................... 446/330; 119/707; 446/353; 446/72; 446/73
[58] Field of Search ................................ 446/330, 71, 72, 446/73, 3; 119/707, 702, 711, 709

[56] References Cited

U.S. PATENT DOCUMENTS

| | | | |
|---|---|---|---|
| Re. 35,375 | 11/1996 | Park ........................................ | 446/484 |
| 711,323 | 10/1902 | Kingsbury . | |
| 4,068,401 | 1/1978 | Saitoh ...................................... | 446/111 |
| 5,320,573 | 6/1994 | Matsuyama .............................. | 446/358 |
| 5,653,196 | 8/1997 | Bartleson ................................ | 119/711 |

*Primary Examiner*—Jacob K. Ackun
*Assistant Examiner*—Urszula M. Cegielnik
*Attorney, Agent, or Firm*—Nixon Peabody LLP; Daniel W. Sixbey

[57] ABSTRACT

A cat toy formed from a soft, breathable material which will pass the aroma of catnip. A closable flexible pouch for catnip is formed at the bottom of the body and a vibratory motor is positioned in contact with the pouch to impart vibratory energy to the pouch and propel the cat toy. The vibratory motor may be activated by a pull cord which extends externally of the body of the cat toy.

12 Claims, 1 Drawing Sheet

U.S. Patent
Dec. 5, 2000
6,155,905
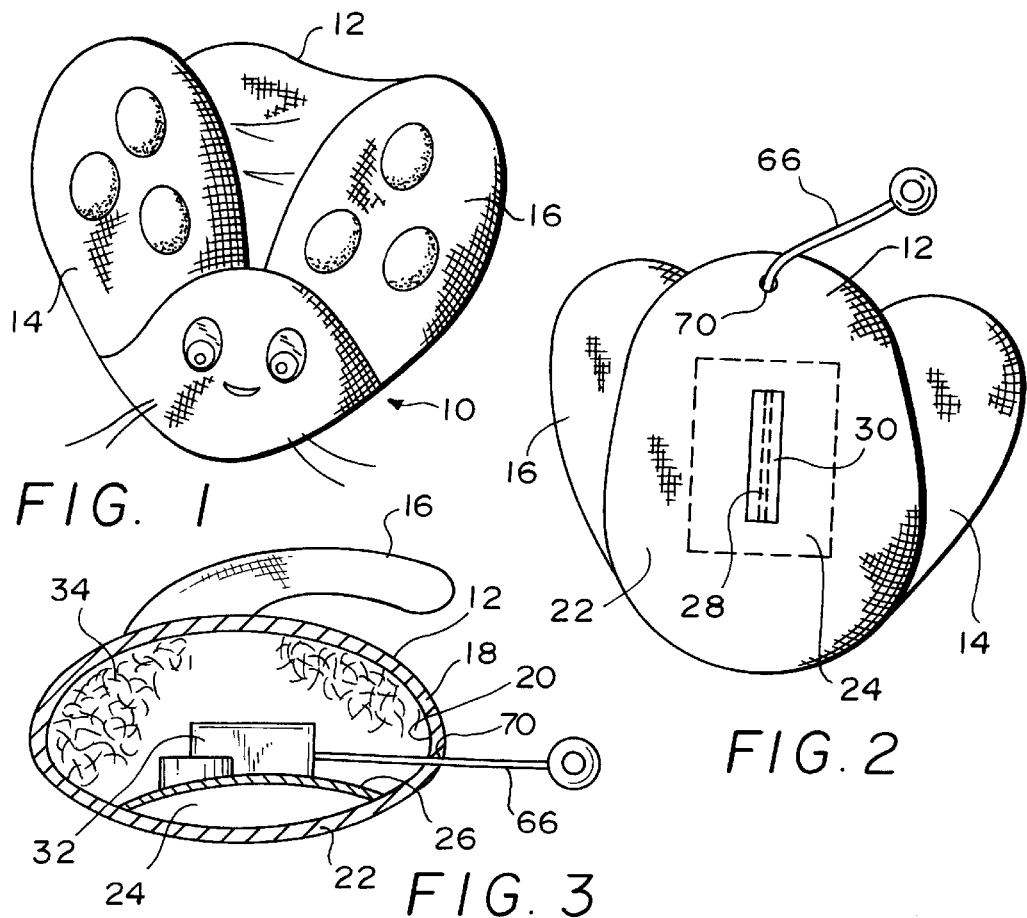
FIG. 1
FIG. 2
FIG. 3
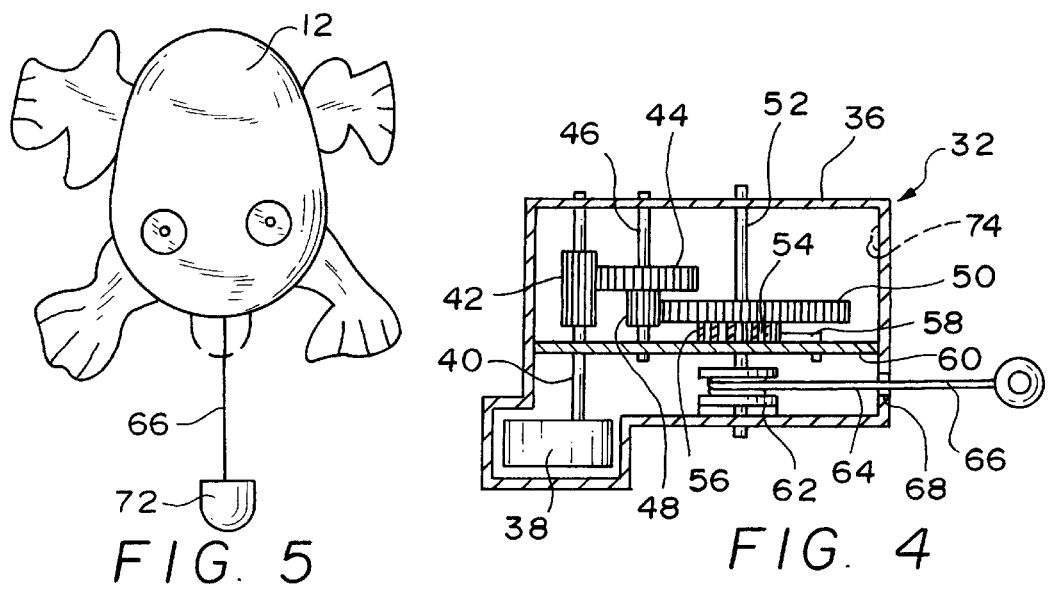
FIG. 5
FIG. 4

CAT TOY

This application is a continuation-in-part application of U.S. Provisional Ser. No. 60/095,220 filed Aug. 4, 1998.

TECHNICAL FIELD

The present invention relates generally to an animated cat toy, and more particularly to an animated cat toy which, in operation, exudes the scent of catnip.

BACKGROUND OF THE INVENTION

Cats are known to enjoy chasing and playing with small moving objects, and particularly objects that move randomly in various directions. Furthermore, cats have a known affinity for the smell of catnip, and are drawn to any object containing catnip. Therefore, an ideal cat toy would be a soft toy which would not injure a cat, which moves randomly and which exudes the smell of catnip.

Small toys with internal motor mechanisms to move the toy and power toy appendages are well known as illustrated by U.S. Pat. Nos. 711,323 to Kingsbury and 5,320,573 to Matsayuma. Such toys are generally not suitable as cat toys, for they contain moving parts which are quickly destroyed by a cat and hard surfaces which can result in injury to a cat.

SUMMARY OF THE INVENTION

It is a primary object of the present invention to provide a novel and improved cat toy having a soft body which surrounds and cushions hard components which could cause cat injury to prevent contact by a cat with the hard components.

Another object of the present invention is to provide a novel and improved cat toy which includes a catnip containing pouch which contacts a support surface for the toy and which is subjected to vibration by a vibratory motor which propels the toy.

A still further object of the present invention is to provide a novel and improved cat toy in the form of a small animal having an appendage attached to the actuating cord for a vibratory motor.

These and other objects of the present invention are achieved by providing a cat toy having a soft, breathable body which will pass the aroma of catnip. The body contains a closable pouch for catnip at the bottom of the toy which will contact a toy support surface, and the pouch is formed to transmit vibrations to catnip within the pouch. A vibratory motor is positioned on top of the pouch, and the body is filled with soft material which facilitates the vibration of the vibrator unit. The vibrator unit is activated by a pull cord which extends externally of the body of the cat toy and which may be attached to an appendage of the animal body constituting the cat toy. The appendage is pulled outwardly away from the animal body to activate the vibrator unit.

BRIEF DESCRIPTION OF THE DRAWINGS

FIG. 1 is a perspective view of the cat toy of the present invention;

FIG. 2 is a bottom plan view of the cat toy of FIG. 1;

FIG. 3 is a sectional view of the cat toy of FIG. 1;

FIG. 4 is a sectional view of the vibrator unit of FIG. 3; and

FIG. 5 is a plan view of a second embodiment of the cat toy of the present invention.

DESCRIPTION OF THE PREFERRED EMBODIMENT

The cat toy of the present invention indicated generally at 10 is formed in the shape of a small animal, an insect or a reptile. The shape or configuration of the cat toy is discretionary, and in FIG. 1, the toy includes a body 12 with projecting wings 14 and 16. The body of each toy is formed of an outer layer 18 of soft, breathable material, such as felt, which completely surrounds and encloses an internal chamber 20. Within the chamber 20 adjacent to a bottom wall 22 for the body 12, an enclosed pocket 24 is formed by the bottom wall 22 and a pocket top wall 26 of fabric or other flexible material which is secured to the body bottom wall to form the pocket 24. An opening 28 to the pocket 24 is formed in the bottom wall 22, and this opening is selectively opened and closed by a suitable closure unit 30 which may constitute a Velcro fastener, a zipper or a similar closure member.

A vibrator unit 32 is mounted on the pocket top wall 26 and the chamber 20 is filled with a soft, resilient packing material 34 such as cotton, which maintains the shape of the body 12 while facilitating vibration of the vibrator unit 32. In operation, catnip is inserted in the pocket 24, and activation of the vibrator unit causes vibration to be transmitted to the pocket top wall 26, the catnip in the pocket 24 and the body bottom wall 22. This vibration causes the cat toy 10 to move relative to a flat supporting surface, such as a floor or table top, and agitates the catnip in the pocket 24 to enhance the aroma of catnip passing through the outer layer 18 of the body 12 and particularly through the bottom wall 22.

A number of known mechanical or battery powered vibrators can be used as the vibrator 32, but a preferred vibrator is an eccentric weight vibrator of the type shown in FIG. 4. This vibrator includes a housing 36 which encloses a circular weight 38 eccentrically mounted on a rotatable shaft 40. The shaft 40 is driven by a gear 42 secured to the shaft 40 which meshes with a gear 44 secured to a rotatable shaft 46. The shaft 46 is driven by a gear 48 secured thereto which meshes with a drive gear 50 mounted on a rotatable shaft 52. A leaf spring 54 has a first end 56 secured to the drive gear and a second end 58 secured to an inner wall 60 of the housing 36. The leaf spring has plural convolutions extending around the shaft 52 and is tightened to bias the drive gear 50 when the drive gear is rotated in a first direction. To tighten the leaf spring, a pulley 62 is secured to the rotatable shaft 52, and a pull cord 64, having one end secured to the pulley, is wrapped multiple times around the pulley. A free end 66 of the pull cord exits the housing 36 through an opening 68 and passes outwardly of the body 12 through an opening 70.

To operate the vibrator 32, the free end of the pull cord is pulled away from the body 12 and as the pull cord unwinds from the pulley 62, the pulley rotates the shaft 52 in the first direction tighten the leaf spring 54. When the pull cord is released, the bias of the leaf spring rotates the drive gear and the shaft 52 in a second direction opposite to the first direction. This causes the pull cord to rewind on the pulley 62 and the drive gear 50 to drive the gear 44 by means of the gear 48. Rotation of the gear 44 drives the gear 42 to rotate the eccentric weight 38 causing the housing 36 to vibrate. Regardless of whether the vibrator 32 is mechanically or electrically driven, the use of a rotating eccentric weight is preferred, as the off-center forces created by the rotation of the eccentric weight enhance the propulsion of the cat toy 10 over a flat surface.

Externally of the body 12 of the cat toy 10, the free end 66 of the pull cord 64 may be attached to and enclosed by an appendage of the small animal such as a tongue 72, a tail, an ear, a leg or even an eye. This appendage normally rests against the body 12 over the opening 70, as shown in broken lines in FIG. 5, and is pulled outwardly away from the body to rotate the pulley 62. The cord 64, the opening 68 and the opening 70 can be repositioned to correspond to a designed appendage. To release the cord, it can pass from the pulley 12 and slide through U shaped orienting grommets attached to the inside of the housing 36, one of which is shown in broken lines at 74.

I claim:

1. A pet toy comprising:
   a body formed of soft material, said body having an outer layer of soft, breathable material which defines an inner chamber and a bottom wall for said pet toy,
   a receptacle for catnip formed within said body and positioned within said inner chamber, said receptacle for catnip being formed of flexible material,
   and a motor for propelling the cat toy mounted within said body and positioned within said inner chamber,
   said motor being formed by a vibrator mounted on said receptacle to impart vibrations to said receptacle and to propel said pet toy by vibration.

2. The pet toy of claim 1 wherein said body is in the form of an animal having at least one external appendage separable from said body, said vibratory motor including an activation cord extending through said body and connected to said appendage to hold said appendage against said body, said vibratory motor being activated by pulling said appendage and activation cord outwardly away from said body and subsequently releasing said appendage and activation cord.

3. The pet toy of claim 2 wherein said appendage is in the form of an animal tongue.

4. The pet toy of claim 1 wherein said bottom wall forms a wall for said receptacle, said bottom wall including an access opening for said receptacle, said access opening being formed with a closure member to open and close said access opening.

5. The pet toy of claim 4 wherein said motor includes a housing, an eccentric weight mounted for rotation within said housing, spring bias drive means mounted in said housing to rotate said eccentric weight by spring bias and an activation cord connected to said spring bias drive means to apply bias to said spring bias drive means, said activation cord extending externally of said body and operating when pulled outwardly away from said body to apply bias to said spring bias drive means.

6. A pet toy comprising:
   a body formed of soft material, said body being in the form of an animal having at least one external appendage separable from said body,
   a vibratory motor which propels said pet toy by vibration mounted within said body and having an activation cord extending through said body and connected to said appendage to hold said appendage adjacent to said body, the vibratory motor being activated by pulling the appendage and activation cord outwardly away from said body and subsequently releasing said appendage and activation cord, the vibratory motor including a housing, an eccentric weight mounted for rotation within said housing, and spring bias drive means mounted in said housing to rotate said eccentric weight by spring bias, said activation cord being connected to said spring bias drive means to apply bias to said spring bias drive means when said activation cord is pulled outwardly away from said body,
   and a receptacle for catnip formed within said body.

7. A pet toy comprising:
   a body in the form of an animal formed from an outer layer of soft, breathable material which defines an inner chamber and a bottom wall for said pet toy,
   a vibratory motor for propelling said pet toy by vibration mounted in said inner chamber and having an activation cord extending through said body to active said vibratory motor by pulling said activation cord outwardly away from said body and subsequently releasing said activation cord,
   said vibratory motor including a housing, an eccentric weight mounted for rotation within said housing, and spring bias drive means mounted in said housing to rotate said eccentric weight by spring bias, said activation cord being connected to said spring bias drive means to apply bias to said spring bias means when said activation cord is pulled outwardly away from said body, and
   a resilient packing material filling said inner chamber around said vibratory motor to facilitate vibration while maintaining the animal shape of said body.

8. The pet toy of claim 7 which includes an animal appendage separable from said body, said activation cord being attached to normally hold said appendage against said body, said appendage and activation cord being pulled outwardly away from said body and subsequently released to activate said vibratory motor.

9. The pet toy of claim 8 wherein said appendage is in the form of an animal tongue.

10. The pet toy of claim 8 wherein a receptacle for catnip is formed in said inner chamber.

11. The pet toy of claim 10 wherein said receptacle for catnip is formed of flexible material, said motor being formed by a vibrator mounted in contact with said receptacle to impart vibrations to said receptacle and to propel said cat toy by vibration.

12. The pet toy of claim 11 wherein said bottom wall forms a wall for said receptacle, said bottom wall including an access opening for said receptacle, said access opening being formed with a closure member to open and close said access opening.

* * * * *